United States Patent
Marzocchi

[11] 3,865,682
[45] Feb. 11, 1975

[54] GLASS FIBER REINFORCED ELASTOMERS

[75] Inventor: Alfred Marzocchi, Cumberland, R.I.

[73] Assignee: Owens-Corning Fiberglas Corporation, Toledo, Ohio

[22] Filed: May 4, 1972

[21] Appl. No.: 250,303

[52] U.S. Cl................ 161/170, 117/72, 117/76 T, 117/126 GS, 117/126 GN, 152/361 R, 161/176, 161/193, 260/3, 260/29.3, 260/29.4 R, 260/38
[51] Int. Cl....... B32b 5/02, C03c 25/00, C08k 1/14
[58] Field of Search........... 161/175, 176, 170, 193; 117/126 GS, 126 GB, 72, 76 T; 260/3, 29.3, 29.4 R, 38, 42.15, 42.18, 42.47, 42.43, 262

[56] References Cited
UNITED STATES PATENTS

| | | | |
|---|---|---|---|
| 2,755,269 | 7/1956 | Moorhead | 260/448.8 R |
| 3,045,036 | 7/1962 | Jex | 260/38 X |
| 3,052,583 | 9/1962 | Carlstrom | 117/126 GS |
| 3,081,195 | 3/1963 | Biefeld | 117/126 GS |
| 3,155,567 | 11/1964 | Harr | 117/126 GS |
| 3,424,608 | 1/1969 | Marzocchi et al. | 260/29.3 X |
| 3,705,073 | 12/1972 | Marzocchi et al. | 260/29.3 X |
| 3,725,123 | 4/1973 | Marzocchi et al. | 260/38 X |

*Primary Examiner*—William J. Van Balen
*Assistant Examiner*—Lorraine T. Kendell
*Attorney, Agent, or Firm*—Carl G. Staelin; John W. Overman; Keith V. Rockey

[57] ABSTRACT

This invention is addressed to the treatment of glass fibers in the establishment of a more secure bonding relationship between glass fibers and elastomeric materials in which individual glass fibers are coated, or bundles of glass fibers are impregnated with a blend of an alkaline elastomer latex and a resin prepared by reaction of resorcinol and an aldehyde in the presence of an amino silane or a resorcinolato silane. Use can also be made of a resin prepared by reaction of melamine or urea and an aldehyde in the presence of an amino silane.

23 Claims, 3 Drawing Figures

PATENTED FEB 11 1975  3,865,682

GLASS FIBER REINFORCED ELASTOMERS

This invention relates to glass fiber-elastomeric products, and more particularly to the treatment of glass fibers and compositions in the treatment of glass to facilitate the combination of glass fibers with elastomeric materials such as the manufacture of glass fiber-reinforced elastomeric products.

The term "glass fibers," as used herein is intended to refer to and include (1) continuous fibers formed by the rapid attenuation of hundreds of streams of molten glass and to strands formed when such continuous glass fiber filaments are gathered together in forming; and to yarns and cords formed by plying and/or twisting a number of strands together, and to woven and non-woven fabrics which are formed of such glass fiber strands, yarns and cords, and (2) discontinuous fibers formed by high pressure steam or air directed angularly downwardly onto multiple streams of molten glass issuing from the bottom side of a glass melting bushing and to yarns that are formed when such discontinuous fibers are allowed to rain down gravitationally onto a foraminous surface wherein the fibers are gathered together to form a silver which is drafted into a yarn; and to woven and non-woven fabrics formed of such yarns of discontinuous fibers, and (3) combinations of such continuous and discontinuous fibers in strands, yarns, cords and fabrics formed thereof.

As used herein, the term "elastomer" is intended to mean and include natural rubber in the cured or uncured stage, vulcanized or unvulcanized stage, and synthetic organic elastomeric materials such as styrene, nitriles, acrylics and esters and terpolymers thereof with styrene and acrylonitriles; styrene and vinyl pyridine; and EPDM rubbers as represented by butadiene polymers and copolymers with monoolefins such as butadiene-styrene copolymer, butadiene-acrylonitrile copolymers, butadiene-styrenevinyl pyridine terpolymers, chloroprene, isoprene, neoprene, isobutyl rubber and the like elastomeric polymers and copolymers in their cured or uncured stages, and vulcanized or unvulcanized stages. Included also are the EPDM rubbers, such as formed by the interpolymerization of ethylene, an alpha-monoolefin having from 3–20 carbon atoms, such as propylene, and a polyene, such as dicyclopentadiene, 1,4-hexadiene and preferably an alkylene or alkylidene norbornene, such as 5-alkylidene-2-norbornene and the like in which the alkylidene group numbers from 2–12 carbon atoms, polyurethane rubbers and polysulfone rubbers.

It is now well known to combine glass fibers with elastomeric materials in the manufacture of glass fiber-reinforced elastomeric products, such as driving belts, timing belts, pneumatic tires, etc. One of the problems which has been encountered in such combinations of glass fibers with elastomeric products is the problem of securely anchoring the glass fiber surfaces to the elastomeric material in which the glass fibers are distributed. It is believed that this problem stems in part from the fact that the glass fibers are completely smooth, rod-like members and in part from the fact that the glass fiver surfaces are highly hydrophilic in nature, thereby resulting in the formation of a thin but tenacious film of moisture on the glass fiber surfaces which serves to destroy any bond, chemical or physical, which would otherwise be formed between the glass fiber surfaces and the elastomeric material with which the glass fibers are combined.

To minimize the problems of bonding the glass fiber surfaces to the elastomeric materials, it has been the practice in the manufacture of glass fiber-reinforced elastomeric products to make use of glass fibers in the form of individual glass fibers having a coating on the surfaces thereof to intertie the individual glass fibers to the elastomeric material in which the glass fibers are distributed, or preferably glass fibers in the form of yarns, cords, strands or fabrics, hereinafter referred to as bundles, containing an impregnant therein which also serves to intertie the glass fiber bundles to the elastomeric material in which the bundles are distributed.

In U.S. Pat. No. 3,591,357, description is made of various blends or combinations of a resorcinol-aldehyde resin with at least one elastomer latex, such as a natural rubber latex, vinyl pyridine-butadiene-styrene terpolymer latex, etc., as an adhesive composition in the treatment of glass fibers to enhance the bonding relationship between glass fibers and elastomeric materials in the manufacture of glass fiber-elastomeric products. Such compositions are now frequently referred to in the art as "RFL" systems and can be applied to glass fibers in the form of a thin coating on the individual glass fibers, or preferably as an impregnant in a bundle of glass fibers which may or may not contain a size coating. RFL compositions are commercially available from the U.S. Rubber Company under the trade name "Lotol" and can be prepared in accordance with the methods described in Canadian Pat. No. 435,754.

As described in the foregoing Canadian patent, such RFL systems can be prepared by reacting resorcinol and a lower aliphatic aldehyde, preferably formaldehyde, in aqueous medium in the presence of a primary or secondary amine to form an aqueous solution of a resin which can be added to an alkaline elastomer latex, without resulting in precipitation of the resin or in coagulation of the latex. The resulting blend of the resorcinol-aldehyde resin and the elastomer latex is quite stable and can be used in the treatment of glass fibers as described above.

In the treatment of glass fibers with RFL systems of the type described, it is frequently desirable to add to the RFL an anchoring agent, preferably in the form of an organo silicon compound to more securely bond the RFL to the glass fiber surfaces. However, the use of such anchoring agents with RFL systems can be disadvantageous in that there is a tendency for the organo silicon compound to coagulate the latex or otherwise disturb the stability of the system. In addition, there is also a pronounced tendency for the anchoring agent to migrate away from the glass fiber and toward the elastomeric material constituting the continuous phase of a glass fiber reinforced elastomeric product during vulcanization or cure of the treated glass fibers in combination with an elastomeric material since the organo silicon compound is not securely chemically bound in the RFL system. The result is that the bond between the glass fibers and the RFL can become weakened as a consequence of cure and/or vulcanization.

It is accordingly an object of the invention to provide a composition for use in the treatment of glass fibers and glass fibers treated therewith wherein the treated glass fibers can be more securely integrated with elastomeric materials in the manufacture of glass fiber-elastomeric products.

It is a more specific object of the present invention to provide a composition for use in the treatment of glass fibers in the form of individual glass fiber filaments or preferably in the form of bundles of glass fibers, formed of a combination of resorcinol-aldehyde resin and an elastomer wherein the resorcinol-aldehyde component is modified to include an organo-silicon compound chemically bound thereto.

These and other objects and advantages of the invention will appear more fully hereinafter and for purposes of illustration, and not of limitation, an embodiment of the invention is shown in the accompanying drawing in which.

Figure 1:
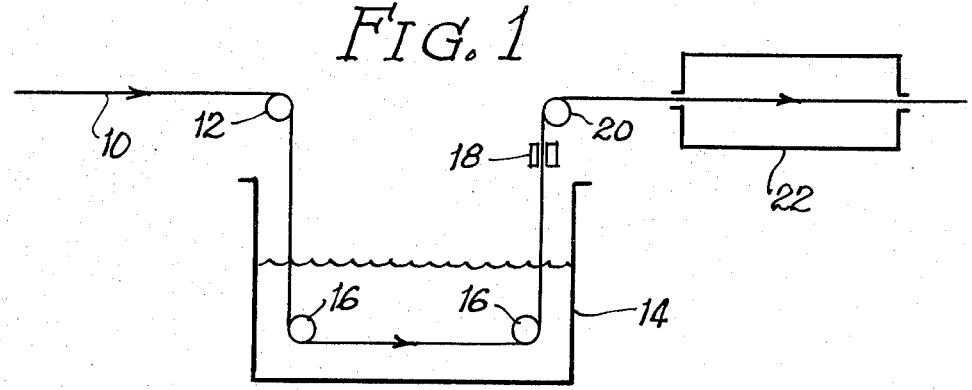
FIG. 1 is a flow diagram illustrating the treatment of glass fibers subsequent to their being formed into bundles to impregnate the glass fiber bundles in accordance with the preferred practice of this invention.

The concepts of the present invention reside in a composition for use in the treatment of glass fibers to provide a more secure bonding relationship between glass fibers and elastomeric materials in the manufacture of glass fiber-reinforced elastomeric products formulated of a resorcinol-aldehyde resin component and an elastomer component wherein the resorcinol-aldehyde resin is modified to have chemically bound in the matrix thereof an organo-silicon compound to further enhance adhesion of elastomeric materials to the glass fiber surfaces. It has been found that by providing a resin component in which an organo-silicon compound is chemically bonded, migration of the organo silicon compound away from the glass fiber surfaces is substantially minimized, with the result that the bonding relationship between the glass fiber surfaces and elastomeric materials with which the glass fibers are combined is significantly improved.

In accordance with one embodiment of the invention, the resorcinol-aldehyde resin component is prepared by reacting resorcinol and an aldehyde in the presence of a primary or secondary amine and in the presence of an amino silane, silanol or polysiloxane. It has been found that the amino silane becomes chemically bonded in the resorcinol-aldehyde matrix to provide a resin solution which can be combined with an alkaline elastomer latex without precipitating the resin or coagulating the latex. The combination of the modified resin and elastomer latex can then be used in the treatment of glass fibers whereby the organo-silicon component serves to form a more secure bond of the composition to the glass fiber surfaces.

As used herein, the term amino silane is intended to refer to and include an organo silane containing 1 to 3 readily hydrolyzable groups (e.g., halogen, lower alkoxy such as methoxy, ethoxy, propoxy, etc.) and at least one organic group attached directly to the silicon atom and having 2 to 10 carbon atoms substituted by at least one amino group, with any remaining valances on the silicon atom being taken up by hydrogen. Also included are the silanols and siloxanes corresponding to the above silanes as well as quaternized silanes substituted with alkyl or alkanolyl groups.

Preferred are silanes having the formula $$Z_{(4-n)} SiR_n$$

wherein Z is a readily hydrolyzable group as described above, $n$ is an integer from 1 to 3, and R is an organic group containing 2 to 10 carbon atoms substituted by at least one amino group.

Representative of suitable amino silanes include:
Beta-aminoethyltrichlorosilane
Gamma-aminopropyltrimethoxysilane
Delta-aminobutyltrimethoxysilane
Beta-aminovinyltrimethoxysilane
Gamma-aminoallyltriethoxysilane
p-aminophenyltrimethoxysilane
N-(beta-aminoethyl)-gamma-aminopropyltriethoxysilane In accordance with another embodiment of the invention, the organo silicon component is introduced to the resorcinol-aldehyde matrix by carrying out the reaction of the resorcinol, aldehyde and primary or secondary amine in the presence of a resorcinolato silicon compound of the type disclosed and claimed in my copending application Ser. No. 98,813, filed Dec. 16, 1970. As described in this application, such resorcinolato silicon compounds have the formula

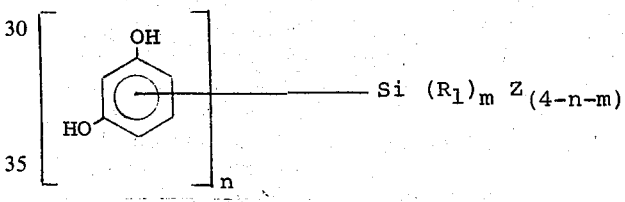

or the formula

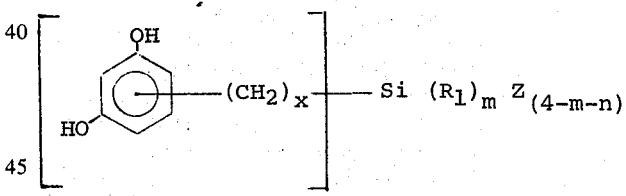

wherein $n$ is an integer from 1 to 3, $R_1$ is an organic group other than resorcinolato, $m$ is 0 or an integer from 1 to 2, $x$ is an integer from 1 to 4, and Z is as described above. For a further description of these resorcinolato silicon compounds, reference can be made to the foregoing application, the disclosure of which is incorporated by reference.

Representative of resorcinolato silicon compounds include the following:

2,4-dihydroxyphenyltrichloro silane, 2,4-dihydroxyphenyltriethoxy silane, 2,4-dihydroxy silane, 2,4-dihydroxyphenylvinyldichloro silane, 2,4-dihydroxyphenylallyldiethoxy silane, 2,4-dihydroxyphenylbenzyldimethoxy silane, 2,3-dihydroxyphenyl-p-aminophenyldimethoxy silane, 2,4-dihydroxyphenyl-3-aminopropyldimethoxy silane, 2,4-dihydroxyphenyl-3-glycidoxy-propyldiethoxy silane, 2,4-dihydroxyphenylcyclohexyldichloro silane, 2,4-dihydroxyphenyl-gamma-aminoallyldiethoxy silane, bis(2,4-dihydroxyphenyl)dichloro silane, tris(2,4- dihydroxyphenyl)monochloro silane, bis(2,4-dihydroxyphenyl)ethoxy silane, 2,4-dihydroxyphenyldichloro silane, 2,6-dihydroxyphenyldimethoxy silane, 2,6-dihydroxyphenylvinyldichloro silane, 2,6-dihydroxyphenyl-2-aminoethyldimethoxy silane, 2,4-dihydroxybenzyltrichloro silane, 2,6-dihydroxybenzyltribromo silane, 2,4-dihydroxybenzyltrimethoxy silane, 2,4-dihydroxybenzylmethyldichloro silane, 2,6-dihydroxybenzylpropyldimethoxy silane, 2,4-dihydroxybenzylvinyldichloro silane, 2,6-dihydroxybenzylallyldimethoxy silane, 2,4-dihydroxybenzylphenyldichloro silane, 2,4-dihydroxybenzyl-gamma-aminopropyldiethoxy silane, 2,6-dihydroxybenzylcyclopentyldichloro silane, bis(2,4-dihydroxybenzyl)dichloro silane, bis(2,6-dihydroxybenzyl)chloro silane, tris(2,4-dihydroxybenzyl)ethoxy silane and bis(2,4-dihydroxybenzyl)ethylchloro silane.

Preferred are the silanes containing alkoxy groups, which are less acidic as compared to the silanes in which Z is a halogen atom.

It is believed that the foregoing resorcinolato silicon compounds are bonded in the resorcinol-aldehyde matrix through the resorcinol group, leaving the silicon group available for bonding to the glass fiber surfaces.

In the preparation of organo silicon compound modified resorcinol-aldehyde resins for use in the practice of the present invention, resorcinol, an aldehyde and preferably formaldehyde, the amine and the organo silicon compound are reacted in aqueous solution. Reaction temperature is not critical as room temperature is sufficient. Generally reaction temperatures from 0° to 80°C can be employed. With higher temperatures, it is frequently desirable to make use of high pressures.

As the amine, use can be made of any primary or secondary, water soluble aliphatic amine. Preferred amines are those having the formula

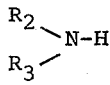

wherein $R_2$ is alkyl containing 1 to 4 carbon atoms and $R_3$ is hydrogen or alkyl containing 1 to 4 carbon atoms. Representative of such amines are monomethyl amine, monoethyl amine, monopropyl amine, dimethyl amine, diethyl amine, dipropylamine, diisopropyl amine, etc.

The reaction mixture generally contains at least two moles of aldehyde per mole of resorcinol, and preferably 2 to 10 moles of aldehyde per mole of resorcinol; and, at least, 1-3 moles of the amine per mole of resorcinol and preferably 1.3 to 15 moles of amine per mole of resorcinol. The amount of organo silicon compound employed is generally within the range of 0.1 to 0.8 moles of organo silicon compound per mole of resorcinol.

The pH of the reaction mixture is preferably maintained on the alkaline side to insure stability of the reaction and the products. A pH of 8 or higher is usually desirable. Depending upon the amount of amine and the organo silicon compound, the amine component of the reaction mixture is sufficient to provide the desired pH. Where necessary, the pH of the reaction mixture can be adjusted by the addition of a quaternary ammonium hydroxide or by carrying out the reaction under a blanket of ammonia. The latter technique is preferred since it avoids the introduction of additional organic groups. When use is made of a quaternized amino silane, the quaternary N atom serves to adjust the pH of the reaction mixture on the alkaline side.

After reaction, the aqueous solution of the resin is added to an alkaline elastomer latex. Various rubber latices can be used, including alkaline latices of natural rubber, neoprene, butadiene, butadiene-styrene, vinyl pyridine-butadiene-styrene, etc.

While not equivalent to resorcinol-aldehyde resins, the concepts of the invention can also be applied to melamine-aldehyde resins and urea-formaldehyde resins for introduction of an amino silane component into the resin matrix to aid in the bonding of glass fibers with elastomeric materials. In accordance with this concept of the invention, an aldehyde is reacted with urea or melamine in aqueous solution in the presence of an amino silane compound. The amount of aldehyde used is preferably 2 to 8 moles per mole of urea or melamine, and the amount of organo silicon compound is 0.1 to 0.8 moles per mole of urea or melamine.

The resulting resin is preferably applied directly to glass fibers without combination with an elastomeric material, although such modified resins can be blended with elastomer latices if desired.

Having described the basic concepts of the invention, reference is now made to the following examples, which are provided by way of illustration and not by way of limitation, of the practice of the invention in the preparation of organo silicon modified resins and the use of same in the treatment of glass fibers.

EXAMPLE 1

This example illustrates the preparation of a silane modified resorcinol-formaldehyde resin-natural rubber latex glass fiber treating composition.

Solution A is prepared by dissolving 100 parts by weight (0.9 mole) of resorcinol in 180 parts of 25 percent by weight aqueous dimethyl amine (1 mole dimethyl amine). Solution B is prepared by mixing 100 parts by weight of 25 percent by weight aqueous dimethylamine (0.56 mole), 225 parts by weight of 35.6 percent aqueous formaldehyde (2.7 moles formaldehyde) and 0.1 mole of gamma-aminopropyl triethoxy silane.

Solution B is chilled to about 5°C and solution A is added thereto, with stirring, while maintaining the reaction temperature below 25°C. After stirring, the cooling is stopped and the reaction mixture is allowed to reach room temperature.

The resulting mixture is a brown solution which will resinify within 5 to 10 hours. However, prior to resinification, the reaction mixture is added to an elastomer latex to form the following composition:

| | Parts by weight |
|---|---|
| Natural rubber latex (60% solids) | 100 |
| Sulfur | 2.5 |
| ZnO | 2.5 |
| Accelerator | 0.5 |
| Anti-oxidant | 1.0 |
| Modified resorcinol-formaldehyde resin | 15.0 |
| Water for solids content of 35% | |

The amount of the elastomer admixed with the resin solution can be varied within wide ranges. Best results are usually achieved when the resin is admixed with elastomer latex in an amount of 5 to 40 parts by weight resin per 100 parts by weight latex based upon solids.

EXAMPLE 2

This example demonstrates application of the composition prepared in Example 1 as an impregnant.

A bundle of glass fibers, which preferably but not necessarily have a size coating on the individual surfaces thereof, are impregnated with the resorcinol-formaldehyde resin-rubber latex composition prepared in Example 1.

Impregnation of the bundle with this composition can be carried out using conventional means for impregnation. Refering now specifically to FIG. 1 of the drawing, the glass fiber bundle 10 is advanced over a guide roller 12 for passage downwardly into a bath 14 of the composition. The bundle is turned under a pair of rollers 16 to effect a sharp bend which operates to open the bundle to permit complete penetration of the aqueous impregnating composition into the bundle of glass fibers. The impregnated bundle is then raised from the bath for passage through a roller or die 18 which operates to remove excess impregnant from the bundle and to work the solids of the impregnant into the bundle.

Thereafter, the endless bundle is advanced over a roller 20 into a drying oven 22, preferably in the form of an air drying oven maintained at an elevated temperature (e.g. a temperature of 150° to 350°F) to accelerate remote of the aqueous diluent and to set the impregnant in situ in the glass fiber bundle. Alternatively, the impregnated bundle, wet with the aqueous composition, can be subjected to dielectric treatment to coagulate the latex, with little or no drying.

Figure 2:
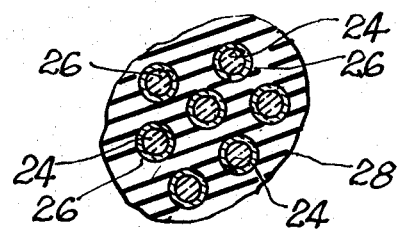
FIG. 2 is a cross-sectional view of a bundle of glass fibers processed in accordance with the flow diagram of FIG. 1.

The resulting bundle is shown in FIG. 2 of the drawing and is formed of a plurality of glass fiber filaments 24 having an optional size coating 26 on the surfaces thereof. The impregnant 28 completely penetrates the bundle to fill the interstices thereof and define a unitary bundle structure.

As will be appreciated by those skilled in the art, it is frequently desirable, as illustrated in Examples 1 and 2, to formulate the treating composition to include vulcanizing agents (e.g. sulfur and/or zinc oxide) and/or conventional accelerators such as mercaptobenzothiazole or allyl cyanurate.

When used as an impregnant for bundles of glass fibers, the composition of this invention is preferably diluted with water to provide a solids content of 10 to 50 percent by weight dry solids. Such impregnants are applied to deposit in the bundle any solids constituting 5 to 25 percent by weight of the glass fibers.

However, compositions of the present invention can be used to more fully protect the surfaces of the glass fibers by application of the composition as a coating on the individual fiber filaments. For this purpose, the composition is generally diluted with water to provide a treating composition having a solids content of 10 to 40 percent by weight, and is applied to glass fiber filaments to deposit thereon dry solids constituting 7 to 20 percent by weight of the coated glass fibers.

EXAMPLE 3

This example illustrates the use of the composition of Example 1, which has been diluted to a solids content of 20% by weight, to coat individual glass fiber filaments.

Figure 3:
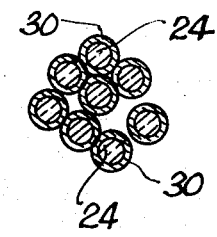
FIG. 3 is a cross-sectional view of glass fibers which have been coated with the treating composition of the present invention.

The composition is applied to glass fiber filaments as they are formed by way of a wiper pad constantly wet with the composition to form a thin coating on the fibers. The coated glass fibers are shown in FIG. 3 of the drawing where the glass fibers 24 have a thin coating 30 on the individual filaments formed of the modified resin-elastomer latex.

EXAMPLE 4

Using the procedure described in Example 1, a modified resorcinol-formaldehyde resin is prepared by reacting the following solutions:

| Solution C: | Resorcinol | 2.3 | moles |
|---|---|---|---|
| | Diethylamine | 2.5 | do. |
| | Water | 30.0 | do. |
| Solution D: | Formaldehyde | 6.7 | moles |
| | Diethylamine | 0.3 | do. |
| | Bis(gamma)aminopropyldiethoxy silane | 0.3 | do. |

The modified resin is then admixed with a rubber latex in an amount sufficient to provide about 20 parts by weight of the modified resin per 100 parts by weight rubber on a solids basis. The resulting system can then be used to impregnate a glass fiber bundle or coat individual glass fiber filaments as described in Examples 2 and 3, respectively.

EXAMPLE 5

Using the procedure described in Example 1, a modified resorcinol-formaldehyde resin is prepared by reacting the following solutions:

| Solution E: | Resorcinol | 2 | moles |
|---|---|---|---|
| | Diethylamine | 2 | do. |
| | Water | 30 | do. |
| Solution F: | Formaldehyde | 6.5 | moles |
| | Diethylamine | 0.7 | do. |
| | N-(beta-aminoethyl)-gamma-aminopropyltriethoxy silane | 0.4 | do. |
| | Tetramethyl ammonium hydroxyde | 0.1 | do. |
| | Water | 80.0 | do. |

The resulting aqueous solution of the modified resorcinol-formaldehyde resin is then added to a butadiene-styrene rubber in an amount sufficient to provide about 17 parts by weight of the resin per 100 parts by weight rubber. This composition can then be used to impregnate bundles of glass fibers or to coat individual glass fibers as described above to more securely bond the glass fibers to elastomeric materials.

EXAMPLE 6

Using the procedure described in Example 1, a silane modified resorcinol-formaldehyde resin is prepared by reacting the following solutions:

| Solution G: | Resorcinol | 2.0 | moles |
|---|---|---|---|
| | 2,4-dihydroxyphenyl-trimethoxy silane | 0.3 | do. |
| | Diethylamine | 2.5 | do. |
| | Water | 30.0 | do. |
| Solution H: | Formaldehyde | 7.0 | moles |
| | Diethylamine | 0.8 | do. |
| | Water | 90.0 | do. |

The resulting resin solution is then added to an alkaline latex to form the following composition:

| Natural rubber latex | 100 | parts by weight |

-Continued

| (60% solids) | | |
|---|---|---|
| Sulfur | 2.5 | do. |
| Zinc oxide | 2.5 | do. |
| Anti-oxidant | 1.0 | do. |
| Resin solution | 6.0 | do. |
| Water, to bring up total solids content to 30% | | |

The foregoing composition can be applied as an impregnant of a glass fiber bundle as described in Example 2, or as a coating for individual glass fibers as described in Example 3.

EXAMPLE 7

The procedure of Example 1 is again repeated, using the following solutions:

| Solution I: | Resorcinol | 2.1 | moles |
|---|---|---|---|
| | 2,4-dihydroxyphenyl- vinyldimethoxy dimethoxy silane | 0.4 | do. |
| | Ethylamine | 2.5 | do. |
| | Tetramethanol ammonium hydroxide | 0.2 | do. |
| | Water | 2.5 | do. |
| Solution J: | Formaldehyde | 6.9 | moles |
| | Ethyl amine | 0.8 | do. |
| | Water | 100.0 | do. |

The resulting resin solution is then admixed with a latex of a vinyl pyridine butadiene-styrene terpolymer to form a glass fiber treating composition. The terpolymer employed in this example contains 15 parts by weight of vinyl pyridine,
15 parts by weight of styrene, and
70 parts by weight of butadiene, and is commercially available from the General Tire and Rubber Co. under the trade name "Gentac FS."

EXAMPLE 8

The procedure of Example 1 is again repeated, using the following solution:

| Solution K: | Resorcinol | 2.1 | moles |
|---|---|---|---|
| | 2,4-dihydroxybenzyl- triethoxy silane | 0.2 | do. |
| | Diethylamine | 2.5 | do. |
| | Water | 30.0 | do. |
| Solution L: | Formaldehyde | 7.2 | moles |
| | Diethylamine | 0.8 | do. |
| | Water | 100.0 | do. |

In carrying out the reaction between solutions K and L, solution L is maintained under an ammonia blanket as solution K is added thereto. The partial pressure of the ammonia is adjusted to maintain the pH of the reaction mixture at about 9.

The resulting resin solution is then added to a natural rubber latex in an amount sufficient to provide a ratio of about 10 parts by weight resin per 100 parts by weight rubber. This solution can then be applied as an impregnant to glass fiber bundles or as a coating on individual glass fiber filaments to promote the bonding relationship between the glass fibers and elastomeric material with which the treated glass fibers are combined in the manufacture of glass fiber-reinforced elastomeric products.

As indicated above, the concepts of the present invention can also be applied in the preparation of aminosilane-modified melamine aldehyde and urea aldehyde resins. These concepts of the present invention can be illustrated by way of the following examples:

EXAMPLE 9

This example illustrates the preparation of a malamineformaldehyde resin which has been modified with gamma-aminopropyltrimethoxy silane.

The following reaction mixture is reacted at 80°C for a period of about 3 hours:

| Melamine | 3.0 | moles |
|---|---|---|
| Formaldehyde | 5.0 | do. |
| Gamma-aminopropyltrimethoxy silane | 0.6 | do. |
| Water | 50.0 | do. |

A terpolymer is formed and is added to a natural rubber latex in an amount sufficient to provide a ratio of about 10 parts by weight resin per 100 parts by weight rubber. This composition can be used in the treatment of glass fibers as discussed above.

EXAMPLE 10

Using the procedure described in Example 9, a urea-formaldehyde resin is prepared with the following reaction mixture:

| Urea | 1.0 | mole |
|---|---|---|
| Formaldehyde | 4.0 | do. |
| Delta-aminobutyltrimethoxy silane | 0.1 | do. |
| Tetramethyl ammonium hydroxide | 0.1 | do. |
| Water | 40.0 | do. |

After about 2 hours, a viscous resin is formed and is added to a butadiene-styrene rubber latex in an amount sufficient to provide a ratio of 11 parts by weight resin per 100 parts by weight rubber. The resulting latex composition can then be used in the treatment of glass fibers in accordance with the procedures described above in Examples 2 and 3.

In the reaction of urea or melamine with the aldehyde in the presence of an amino silane, it is generally preferred that the ratio of aldehyde to melamine be within the range of 3 to 10, and the ratio of the aldehyde to urea be within the range of 2 to 10. It is similarly preferred that the resin formed, which is to be added to an elastomer latex, have a relatively low molecular weight, preferably below 1,500, whereby the resin is in the form of a viscous solid. However, it will be understood by those skilled in the art that high molecular weight resins can similarly be prepared in accordance with the concepts of this invention. Such high molecular weight resins are preferably employed directly in the treatment of glass fibers to form an impregnant in a glass fiber bundle or a thin coating on individual glass fiber filaments, without admixture with an elastomer latex.

In the final system of the glass fibers treated in accordance with the present invention, the elastomeric material, with which the glass fibers in the form of individually coated filaments or impregnated bundles are combined, will constitute a continuous phase. This continuous phase of elastomeric material may comprise elastomers of the type incorporated into the impregnating composition, or the elastomeric material can differ therefrom. The continuous phase of elastomeric material can be employed in the cured or uncured state, or in the vulcanized or unvulcanized state. It is believed that the tie-in between the impregnated bundles of glass fibers or the coated glass fiber filaments occurs primarily during cure or vulcanization of the elastomeric material, in combination with the treated glass fibers.

In fabricating the combinations of the glass fibers treated in accordance with this invention with elastomeric material, the glass fibers or bundles of glass fibers are mixed with elastomeric material or otherwise laid down in a desired arrangement for a combination with the elastomeric material as in the manufature of glass fiber reinforced belts or in the manufacture of pneumatic tires reinforced with cords of glass fibers. The combinations of glass fibers and elastomeric material are processed in a conventional manner by molding or cure under heat and compression, or by vulcanization to advance the elastomeric material to a cured or vulcanized state, while in combination with the treated glass fibers, whereby the glass fibers or bundles of glass fibers become securely integrated with the elastomeric material.

It will be apparent that various changes and modifications can be made in the details of procedure, formulation and use, without departing from the spirit of the invention, especially as defined in the following claims.

I claim:

1. Glass fibers having a thin coating thereon, said coating comprising a blend of an elastomer and a resin preparing by reacting resorcinol and a lower aliphatic aldehyde in the presence of a primary or secondary aliphatic amine and an organo silicon compound selected from the group consisting of a resorcinolato silicon compound of the formula

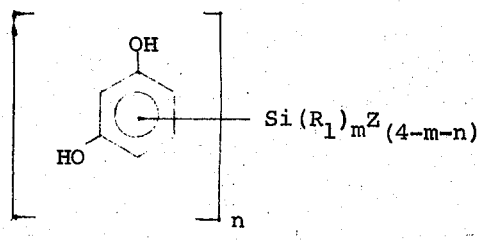

and a resorcinolato silicon compound of the formula

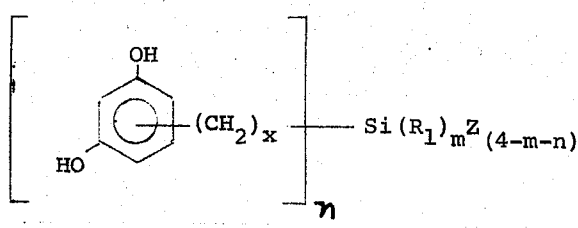

wherein Z is a readily hydrolyzable group, $R_1$ is an organic group other than resorcinol, $n$ is an integer from 1 to 3, $m$ is 0 or an integer from 1 to 2, and $x$ is an integer from 1 to 4.

2. Glass fibers as defined in claim 1 wherein the elastomer is natural rubber.

3. Glass fibers as defined in claim 1 wherein the resin constitutes 5 to 40 parts by weight per 100 parts by weight of the elastomer.

4. Glass fibers as defined in claim 1 wherein the mole ratio of the organo silicon compound to the resorcinol is within the range of 0.1 to 0.8.

5. A glass fiber bundle comprising a plurality of glass fibers and an impregnant in the bundle, said impregnant comprising a blend of an elastomer and a resin prepared by reacting resorcinol and a lower aliphatic aldehyde in the presence of a primary or secondary aliphatic amine and an organo silicon compound selected from the group consisting of a resorcinolato silicon compound of the formula

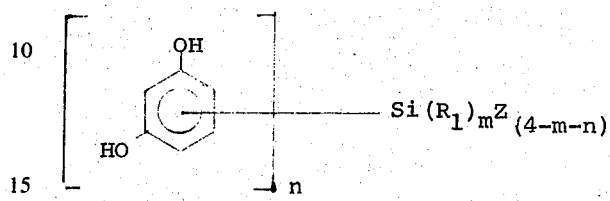

and a resorcinolato silicon compound of the formula

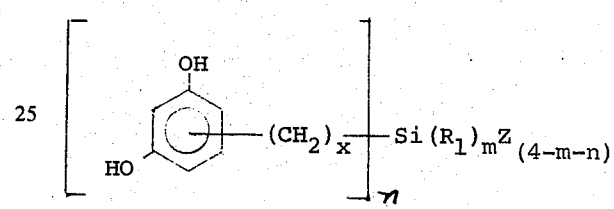

wherein z is a readily hydrolyzable group, $R_1$ is an organic group other than resorcinol, $n$ is an integer from 1 to 3, $m$ is 0 or an integer from 1 to 2, and $x$ is an integer from 1 to 4.

6. A glass fiber bundle as defined in claim 5 wherein the elastomer is natural rubber.

7. A glass fiber bundle as defined in claim 5 wherein the resin constitutes 5 to 40 parts by weight per 100 parts by weight of the elastomer.

8. A glass fiber bundle as defined in claim 5 wherein the mole ratio of the organo silicon compound to the resorcinol is within the range of 0.1 to 0.8.

9. A glass fiber bundle as defined in claim 5 wherein the bundle is formed of strands of glass fibers which have been plied together.

10. A glass fiber bundle as defined in claim 9 wherein the strands have been twisted and plied together.

11. A glass fiber bundle comprising a plurality of glass fibers, each of said glass fibers having a thin size coating on the surfaces thereof, and an impregnant in the bundle, said impregnant comprising a blend of an elastomer and a resin prepared by reacting resorcinol and a lower aliphatic aldehyde in the presence of a primary or secondary aliphatic amine and an organo silicon compound selected from the group consisting of a resorcinolato silicon compound of the formula

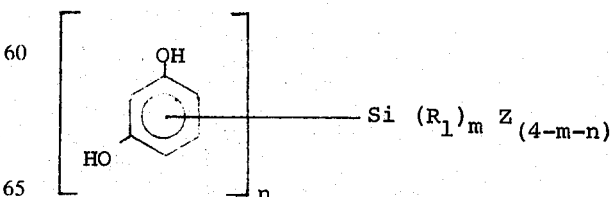

and a resorcinolato silicon compound of the formula

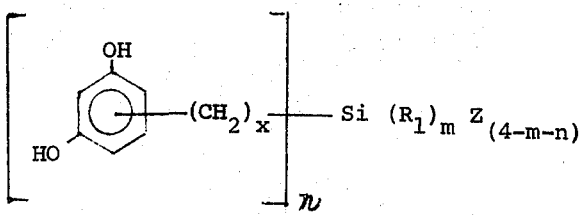

wherein Z is a readily hydrolyzable group, $R_1$ is an organic group other than resorcinol, $n$ is an integer from 1 to 3, $m$ is 0 or an integer from 1 to 2, and $x$ is an integer from 1 to 4.

12. In a glass fiber-reinforced elastomeric product wherein an elastomeric material constitutes a continuous phase in which the glass fibers are distributed, the improvement in the bonding relationship between the glass fibers and the elastomeric material comprising a coating on the glass fibers, said coating comprising an elastomer and a resin prepared by reacting resorcinol and a lower aliphatic aldehyde in the presence of a primary or secondary aliphatic amine and an organo silicon compound selected from the group consisting of a resorcinolato silicon compound of the formula

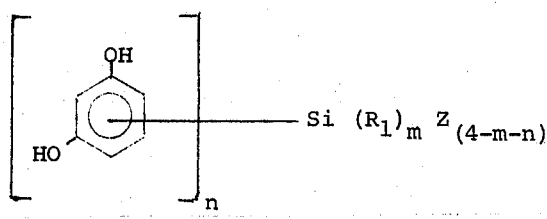

and a resorcinolato silicon compound of the formula

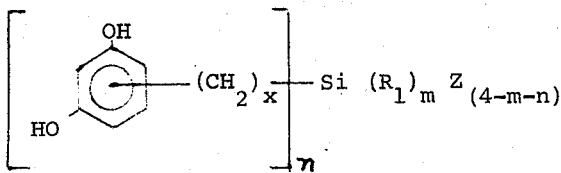

wherein Z is a readily hydrolyzable group, $R_1$ is an organic group other than resorcinol, $n$ is an integer from 1 to 3, $m$ is 0 or an integer from 1 to 2, and $x$ is an integer from 1 to 4.

13. A product as defined in claim 12 wherein the glass fibers are in the form of individual glass fibers, with the coating forming a coating on the individual glass fiber surfaces.

14. A product as defined in claim 12 wherein the glass fibers are in the form of bundles of glass fibers with the coating forming an impregnant in the bundle.

15. A product as defined in claim 12 wherein the elastomer is natural rubber.

16. A product as defined in claim 12 wherein the resin constitutes 5 to 40 parts by weight per 100 parts by weight of the elastomer.

17. A product as defined in claim 12 wherein the mole ratio of the organo silicon compound to the resorcinol is within the range of 0.1 to 0.8.

18. In a glass fiber-reinforced elastomeric product in which an elastomeric material constitutes a continuous phase in which bundles of glass fibers are distributed, the improvement in the bonding relationship between the glass fibers and the elastomeric material comprising a thin size coating on the individual glass fibers and an impregnant in the bundle, the impregnant comprising a blend of an elastomer and a resin prepared by reacting resorcinol and a lower aliphatic aldehyde in the presence of a primary or secondary aliphatic amine and an organo silicon compound selected from the group consisting of a resorcinolato silicon compound of the formula

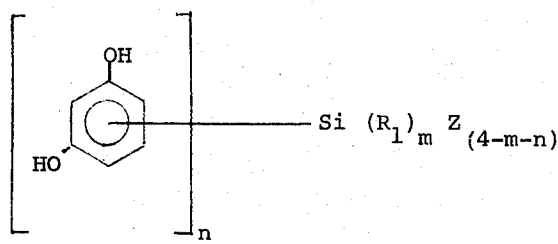

and a resorcinolato silicon compound of the formula

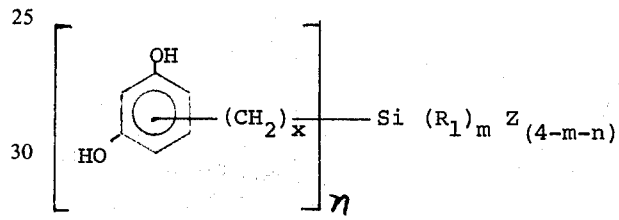

wherein Z is a readily hydrolyzable group, $R_1$ is an organic group other than resorcinol, $n$ is an integer from 1 to 3, $m$ is 0 or an integer from 1 to 2, and $x$ is an integer from 1 to 4.

19. Glass fibers having a thin coating thereon, said coating comprising a blend of an elastomer and a resin prepared by reacting resorcinol and a lower aliphatic aldehyde in the presence of a primary or secondary aliphatic amine and an organo silicon compound selected from the group consisting of a resorcinolato silicon compound of the formula

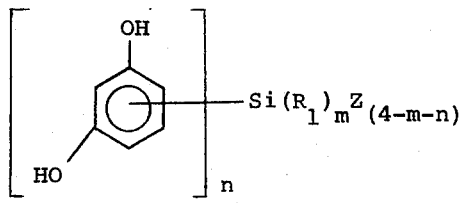

wherein Z is a readily hydrolyzable group, $R_1$ is an organic group other than resorcinol, $n$ is an integer from 1 to 3, $m$ is 0 or an integer from 1 to 2.

20. A glass fiber bundle comprising a plurality of glass fibers and an impregnant in the bundle, said impregnant comprising a blend of an elastomer and a resin prepared by reacting resorcinol and a lower aliphatic aldehyde in the presence of a primary or secondary aliphatic amine and an organo silicon compoud selected from the group consisting of a resorcinolato silicon compound of the formula

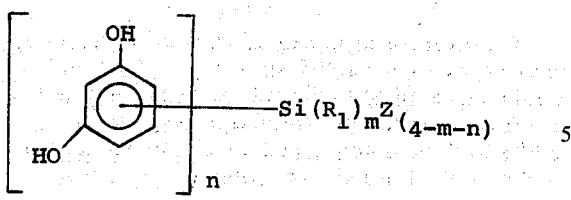

wherein Z is a readily hydrolyzable group, $R_1$ is an organic group other than resorcinol, $n$ is an integer from 1 to 3, $m$ is 0 or an integer from 1 to 2.

21. A glass fiber bundle comprising a plurality of glass fibers, each of said glass fibers having a thin size coating on the surfaces thereof, and an impregnant in the bundle, said impregnant comprising a blend of an elastomer and a resin prepared by reacting resorcinol and a lower aliphatic aldehyde in the presence of a primary or secondary aliphatic amine and an organo silicon compound selected from the group consisting of a resorcinolato silicon compound of the formula

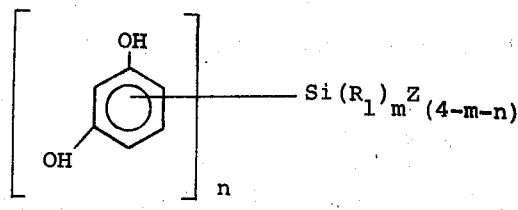

wherein Z is a readily hydrolyzable group, $R_1$ is an organic group other than resorcinol, $n$ is an integer from 1 to 3, $m$ is 0 or an integer from 1 to 2.

22. In a glass fiber-reinforced elastomeric product wherein an elastomeric material constitutes a continuous phase in which the glass fibers are distributed, the improvement in the bonding relationship between the glass fibers and the elastomeric material comprising a coating on the glass fibers, said coating comprising an elastomer and a resin prepared by reacting resorcinol and a lower aliphatic aldehyde in the presence of a primary or secondary aliphatic amine and an organo silicon compound selected from the group consisting of a resorcinolato silicon compound of the formula

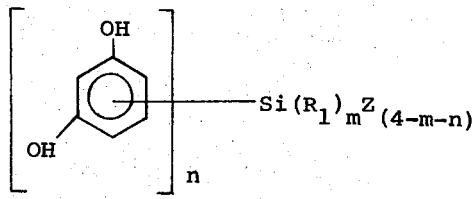

wherein Z is a readily hydrolyzable group, $R_1$ is an organic group other than resorcinol, $n$ is an integer from 1 to 3, $m$ is 0 or an integer from 1 to 2.

23. In a glass fiber-reinforced elastomeric product in which an elastomeric material constitutes a continuous phase in which bundles of glass fibers are distributed, the improvement in the bonding relationship between the glass fibers and the elastomeric material comprising a thin size coating on the individual glass fibers and an impregnant in the bundle, the impregnant comprising a blend of an elastomer and a resin prepared by reacting resorcinol and a lower aliphatic aldehyde in the presence of a primary or secondary aliphatic amine and an organo silicon compound selected from the group consisting of a resorcinolato silicon compound of the formula

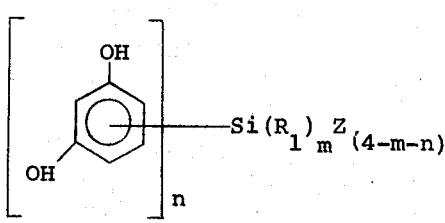

wherein Z is a readily hydrolyzable group, $R_1$ is an organic group other than resorcinol, $n$ is an integer from 1 to 3, $m$ is 0 or an integer from 1 to 2.

* * * * *